United States Patent [19]

Redl

[11] 4,345,531
[45] Aug. 24, 1982

[54] APPARATUS AND METHOD FOR CULTIVATING LAND

[76] Inventor: Narciss A. Redl, 730 Spadina, Apt. 1403, Saskatoon, Saskatchewan, Canada, S7K 4H7

[21] Appl. No.: 140,674

[22] Filed: Apr. 15, 1980

[51] Int. Cl.³ .............................................. A01C 7/00
[52] U.S. Cl. ........................................ 111/1; 47/1 R; 47/9; 171/58; 172/33; 172/572; 172/575
[58] Field of Search .......................... 111/1, 6, 8–12, 111/86, 87, 88; 47/1, 1.42, 9, 58; 172/156, 538, 545, 546, 550, 549, 574, 575, 576, 570, 566, 33, 572; 37/DIG. 16; 171/58

[56] References Cited

U.S. PATENT DOCUMENTS

| | | | |
|---|---|---|---|
| 910,168 | 1/1909 | Brackelsberg | 172/33 X |
| 1,239,599 | 9/1917 | Hicks | 172/32 X |
| 1,276,843 | 8/1918 | Wentworth | 172/32 |
| 1,320,469 | 11/1919 | Hicks | 172/32 |
| 1,500,437 | 7/1924 | Burton | 172/33 |
| 1,906,127 | 4/1933 | Reishus | 172/33 |
| 2,524,871 | 10/1950 | Andrus | 111/1 |
| 2,563,926 | 8/1951 | Elliott et al. | 47/1.42 |
| 2,602,388 | 7/1952 | Elliott et al. | 47/58 X |
| 2,755,719 | 7/1956 | Toulmin | 47/1.42 X |
| 2,775,174 | 12/1956 | Petrick | 47/1.42 X |
| 2,788,725 | 4/1957 | Wilkey et al. | 172/33 |
| 2,858,755 | 11/1958 | Toulmin | 47/1.42 |
| 2,884,742 | 5/1959 | Moore et al. | 47/58 |
| 2,950,566 | 8/1960 | Henry | 47/1 |
| 2,966,128 | 12/1960 | Toulmin | 111/10 |
| 3,127,724 | 4/1964 | Fraresso et al. | 171/58 X |
| 3,410,350 | 11/1968 | Ware | 172/32 |
| 3,425,494 | 2/1969 | Parrish | 171/58 |
| 3,556,026 | 1/1971 | Houston | 111/1 |
| 3,563,191 | 2/1971 | Yovanovich | 111/10 |
| 3,770,064 | 11/1973 | Scarnato | 171/58 |
| 3,880,099 | 4/1975 | Houston et al. | 172/156 X |
| 3,983,942 | 10/1976 | Vega | 172/32 |
| 3,998,276 | 12/1976 | MacMillan | 111/1 |

FOREIGN PATENT DOCUMENTS 2003879  8/1971  Fed. Rep. of Germany ........ 111/10

Primary Examiner—James R. Feyrer
Attorney, Agent, or Firm—Burns, Doane, Swecker & Mathis

[57] ABSTRACT

A method and apparatus of treating or cultivating soil consists of a mobile chassis which when propelled over the ground, has means for removing a predetermined amount of soil from the ground to create an open trench therein, tilling the removed soil and mixing additives therewith and further mixing the soil and forceably replacing the soil into the trench.

1 Claim, 7 Drawing Figures

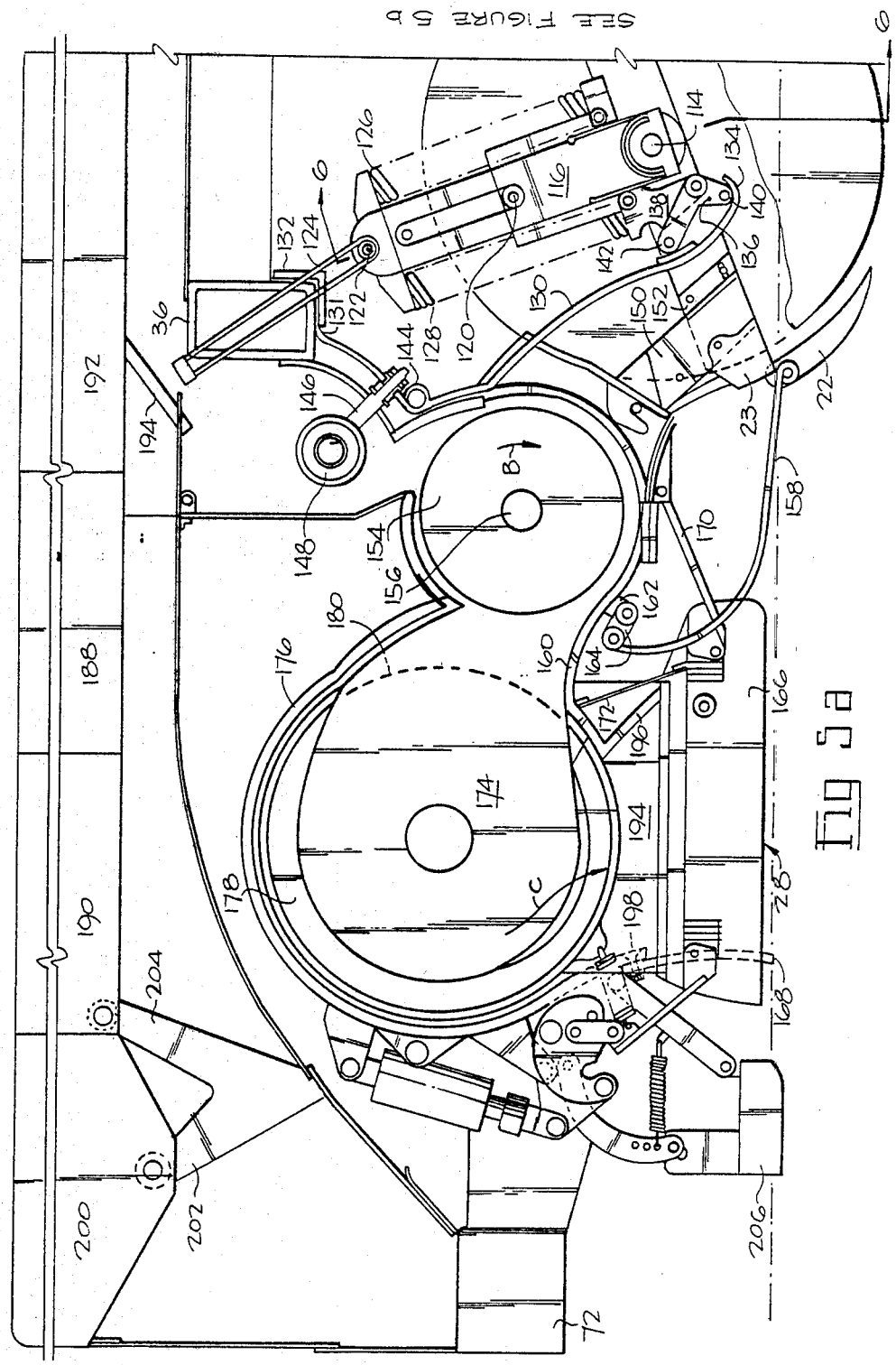

APPARATUS AND METHOD FOR CULTIVATING LAND

BACKGROUND OF THE INVENTION

This invention relates to apparatus and a method for cultivating land. Specifically, the invention incorporates the simultaneous digging of one or more trenches by angularly slitting the soil to define spaced apart trench lines, removing the soil from the slit trench and raising it into the apparatus for conditioning and subsequently conveying the soil, under pressure, back into the trench.

In practice, the present invention provides a yearly, once over method of combining the tillage soil condition and seeding for general grain or other farming. The method includes cutting strips of soil from a preselected width, depth and interval on land which could have been previously cultivated. The cut strips of soil are removed to leave an open trench or trenches with an undisturbed portion of soil therebetween. The soil which is removed from the trench is passed through the apparatus and can be conditioned in such a way as to enhance future plant growth and to substantially eliminate undesirable weed growth. Subsequently, the soil is replaced in whole or in part into the open trench or onto the undisturbed portion of soil between, or adjacent to, the trenches.

Some examples of the art to which the apparatus relates are seen in U.S. Pat. No. 2,884,742, Moore et al, May 5, 1959 and U.S. Pat. No. 3,880,099, Houston et al, Apr. 29, 1975.

The Moore patent discloses a machine for picking up all the soil in its path. The soil is carried upwardly and rearwardly into the confines of the apparatus where the soil is pulverized and if necessary mixed with desired solvents etc. The conditioned soil is passed rearwardly to a device for returning the soil to the ground. The Patent to Houston shows an apparatus for conserving moisture for growing crops where angled discs are used for creating a slit trench so that an inclined watershed area is provided adjacent to the slit trench for drainage of water therein so that the water may be held for some time for the growth of crops.

SUMMARY OF THE INVENTION

Those skilled in the art will appreciate that various types and forms of soil conditioning exist which could be used in whole or in part with the present invention and would vary with different types of soils and weather conditions. Conditioning of the soil by the apparatus of the present invention includes the removal of stones, rocks, weed seeds and any other undesirable matter from the soil passed through the apparatus; crushing the stones etc. to a predetermined size; sterilization of the soil by mechanical, electrical or chemical means and the addition of weed suppressants in liquid, chemical or granular form. Fertilizers can also be supplied in the same manner as can minerals of any type, organic matter in any form and microorganisms in various forms. Soil texturing substances such as peat moss, straw, chemical compunds etc. can also be used. The open trench, prior to replacement of the conditioned soil may also be treated with organic matter, moisture absorbents, chemical or granular fertilizers, weed suppressants, sprays, etc. The undisturbed strips of soil between the trenches can also be treated with weed retardants, covered with previous crop trash or foreign matter, aerated, ridged, etc.

The soil conditioned in the apparatus is subsequently placed in the open trench and may be seeded to a very accurate depth and packed to a preselected consistency. An alternative seeding method is to plant the seed in the undisturbed portion of the soil and then transferring the trash on top of the trenched portion. The following year the same land would be processed using the same method either diagonally or in opposite direction to the trench line of the previous year.

Numerous advantages are derived from using the present invention including the conservation of fuel by using only one apparatus to carry out a plurality of farming operations and as a result, there is substantial labour savings in yearly farming operations. The practice of the method of the present invention reduces the need to summer fallow and it allows the soil to rebuild itself progressively with nutrient elements requiring less and less fertilizer in subsequent years and it progressively eliminates weed infestation.

Any stubble left standing in the undisturbed portions intermediate the trenches along with the year's trash, protects the seedlings and reduces soil erosion by wind and water. Less moisture evaporation occurs through the soil and higher crop yields will result.

According to one aspect, the present invention relates to a method of treating soil comprising the steps of cutting a downwardly and inwardly tapering walled trench and removing soil therefrom; tilling said removed soil and mixing additives therewith; further mixing said soil and forceably replacing soil in the open trench.

According to another aspect, the invention relates to a land cultivating machine comprising a mobile chassis having a frame; and means on the frame for moving a predetermined amount of soil from the ground, cultivating the soil and replacing it in the ground comprising: (a) means for picking up straw ahead of the machine and cutting the straw for subsequent use; means for making a cut of predetermined depth and width to remove crusted or dried soil and to transfer the removed soil to areas on either side of the area to be treated; at least a pair of tapered discs mounted for rotation on said frame; said discs being pivotally mounted on trailing arms from said frame for vertical movement; a shoe for guiding soil cut from the ground by the discs into the confines of the machine; means for removing soil adhering to the surfaces of the discs and directing such soil into the confines of the machine; a tilling device for breaking down soil and mixing additives therewith and for directing said soil into a mixing chamber; means in the mixing chamber for crushing rocks therein, mixing additives with the soil and directing the soil in packing density into the trench from which the soil was removed; means for applying seed onto the top of the trench and covering the seeded soil with mulch.

BRIEF DESCRIPTION OF THE DRAWINGS

The invention is described by way of example in the accompanying drawings in which:

FIGS. 5a and 5b are, together, a detailed side elevation view partly in section of the apparatus of the present invention; and FIG. 6 is a cross-sectional view taken along the line 6—6 of FIG. 5a.

Referring to FIG. 1, a cross-section of ground is shown in which an angled, walled trench 1 has been formed by the apparatus of the present invention. By way of example only, the trench, as illustrated, has been cut and the soil has been removed, conditioned in the apparatus and subsequently replaced in the trench to its illustrated form with a bottom layer of topsoil 2 to which is applied a layer of trash 3, fertilizer 4, and soil 5 conditioned with chemicals or the like and bounded on its upper edges by packed, conditioned soil 6 into which seeds 7 have been planted and evenly spaced. The trench 1 is bounded on either side by stubble 8 and trash overlay 9. It will be appreciated that the above-mentioned formation of conditioned soil and other nutrients shown in FIG. 1 can be rearranged to meet specific area requirements.

Referring to FIGS. 2 through 4, the cultivating machine of the present invention comprises a self-propelled vehicle 10 having connected to either side thereof a series of containers for herbicides, fertilizers, seed or the like and which are illustrated generally at 12. The vehicle 10 is illustrated with a single row of containers on either side thereof but it will be appreciated that the vehicle is capable of drawing or pulling additional containers and cultivating units across the surface of the ground beyond the pair shown in the drawings. The basic vehicle 10 includes a control cab 14 with suitable motor means and driven wheels or tracks 18. The mechanism for treating the soil is situated toward the rear of the vehicle and is illustrated generally at 20 in FIG. 2. Soil is picked up by a shoe 22 situated between and behind a pair of rotating discs 24 and is carried upwardly and rearwardly into a mixing chamber 26 where it is suitably conditioned and is subsequently returned to the trench from which it was removed, between a pair of soil directing dirt guides 28 and is firmly packed in place by centrifugal force from the conditioning apparatus.

Turning to FIGS. 5a and 5b, the apparatus is provided with a side enclosure plate which has been omitted to illustrate the lower portion of the chassis in side view. It will be seen that the chassis includes longitudinal frame ribs 32, a forward transverse frame beam 34 and a rear transverse frame beam 36. Beam 34 is provided with forwardly mounted lugs 38 which provide an anchor means for a wheel actuating cylinder 40 and a second cylinder 42 for raising and lowering the discs 24 in a manner to be described. Cylinder 40 has its rod end 44 connected to lug 46 on the arm 48 of a depth control wheel 50. The upper end of arm 48 is pivotally connected to a further frame lug 52 and arm 48 also serves as a track for a travelling straw pickup conveyor 54 which has a chain or belt 56 trained about a pair of spaced, upper and lower sprockets 58 and 60. The conveyor 54 has a plurality of straw pickup arms 62 which gathers straw in the path of the forwardly travelling machine and carries the straw upwardly and rearwardly under a deflector 64 and into a straw chopping device 66 rotating in the direction of arrow A. Device 66 consists of stationary blades 61 and rotating blades 63. Stones and other heavier material picked up by the arms 62 are dropped by gravity through a slot 65 and any such foreign material striking blades 63 is thrown against deflector 64 and drops downwardly through the slot 65. An air fan generally indicated at 68 is associated with the straw chopping device 66 and by means of the fan 68, the straw is blown rearwardly through a channel 70 to the rear of the vehicle where it is blown down onto the ground through a dividing apparatus 72.

Figure 1:
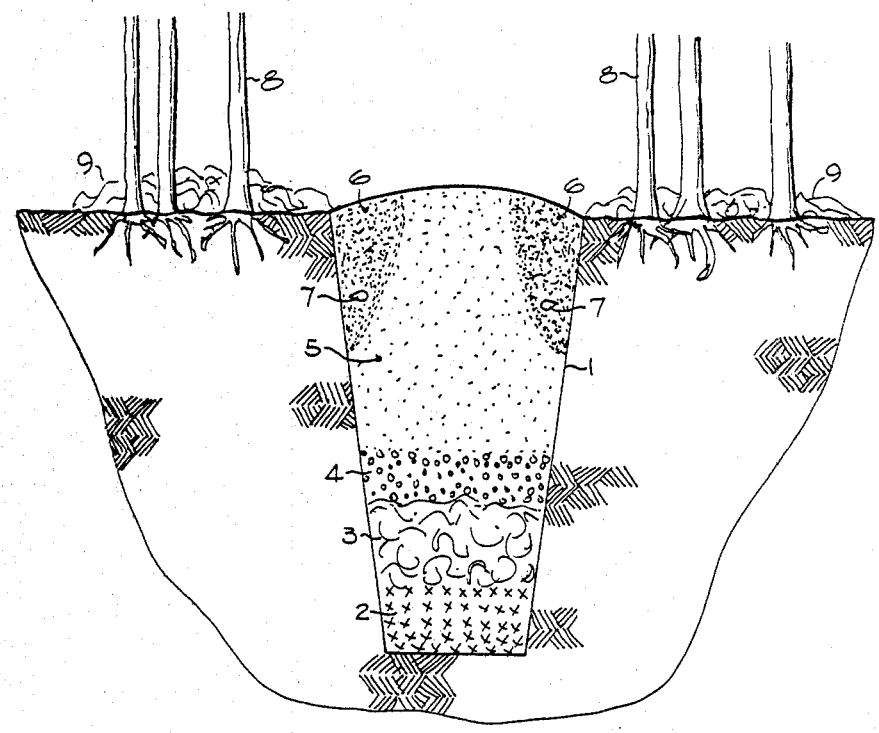
FIG. 1 is a cross-section of a trench created and treated in accordance with the present invention.
Figure 2:
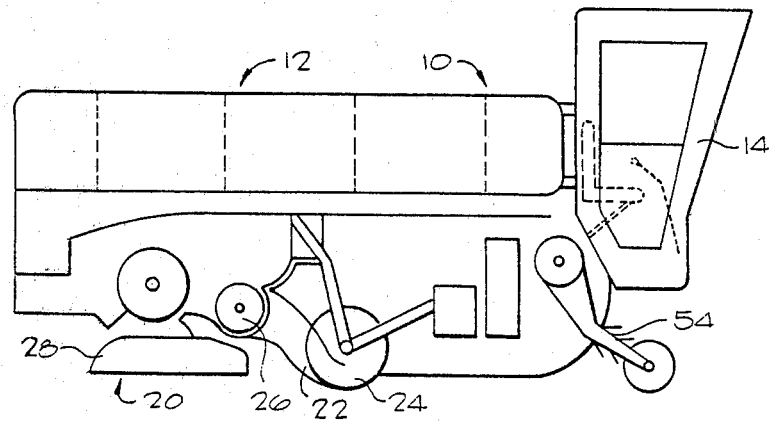
FIG. 2 is a side elevation of the apparatus, in schematic form, of the present invention.

It will be appreciated that the actuation of the hydraulic cylinder 40 will pivot the arm 48 about its connection with lug 52 to raise or lower the forward portion of the apparatus relative to ground level.

The discs 24 are supported on a pair of spaced arms 74 which are secured to a disc frame support 76. This member is in turn connected to the frame beam 34 through primary and secondary link arms 78 and 80 respectively. Arms 78 pivotally connect the member 76 with links 80 and with a vertical member 82. The other ends of links 80 are pivotally connected to lugs 84 that are securely bolted as at 86 to the beam 34. Hydraulic cylinder 42 has its body end pivotally connected to the forward frame lug 38 and its broad end similarly connected to an arm 88 that in turn is pivotally mounted to a lug 90 on top of the frame beam 34. Interconnected with the arm 88 is a further series of arms 92, 94 and 96 which interconnect the disc frame to the arm 88 and the cylinder 42. It will be seen that retraction of the rod 41 into the cylinder 42 will serve to raise the disc frame and its arms 74 together with the discs 24 attached thereto.

Means for breaking up the surface of the soil forwardly of the discs can be provided in the form of a cutter 98 mounted to the lower end of a plow 100. This is connected by an arm 102 to the frame beam 34 through a pivotal mounting 104. Desired downward pressure of the arm 102 is applied through a spring 106 which is secured at one end to a small lug 108 on the frame beam 34 and, at its other end, to a bracket 110 on the arm 102. A flexible cable 112 connects the plow 100 with one of the link arms 78 in the disc suspension mechanism so that when the disc assembly is raised through action of the hydraulic cylinder 42, the plow will be raised also. The depth of the cutter 98 is governed by the wing-like surface of the plow shoe 101. While the plow 100 is not required at all times, its' use is preferred when the soil conditioning plan uses a herbicide spray which can be directed downwardly from a nozzle 99 positioned below the frame lug 52. As the vehicle moves over the ground's surface, such forward movement causes the discs 24 to cut a downwardly tapering, straight-walled trench. This movement causes rotation of the discs 24 and in so doing they pick up soil from the trench and the soil is directed upwardly and rearwardly by the forward motion of the machine.

Figure 6:
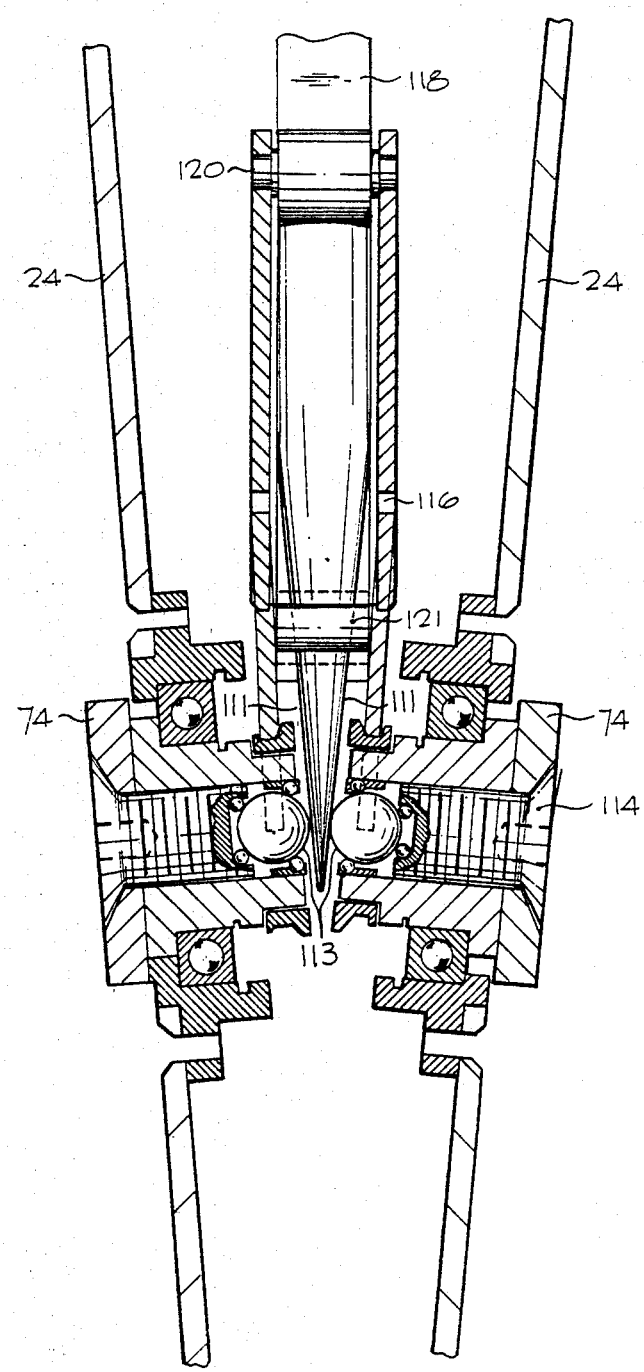

Discs 24 are mounted for rotation on an axle 114 and the discs are maintained in their spaced apart relationship by way of a disc spreading guide generally indicated at 116 and which is mounted in slideway 118 by a short stub axle and bearing 120 as clearly shown in FIG. 6. The upper end of the slideway 118 is pivotally attached at 122 to a locating arm 124 in the frame beam 36. The discs 24 are maintained in their operating position by a pair of hold-down springs 126 and 128. The slideway 118 has tapered lower surfaces 111 and the inner ends of the disc axles 114 are provided with ball bearings 113, the spherical surfaces of the balls 113 riding on the sloped surfaces 111 of the guide 118. When the lower surfaces of the discs 24 encounter an obstruction such as a rock or the like the provision of the hold-down springs 126, 128 provides a resiliency to the discs and they are free to move upward against the tension of the springs, spreading outwardly as they do so due to the interaction between the balls 113 and the sloped surfaces 111 so that, as they spread apart, they tend to free themselves of any matter that may be jammed between them such as a stone or the like.

As the discs 24 rotate and cut the trench therebetween the soil has a tendency to stick to the inside walls of the disc surfaces as the discs rotate, particularly if moist conditions are encountered. The apparatus includes means for stripping the soil from the disc surfaces and this consists of an elongated stripping bar 130 which is mounted at its top end 131 to the frame beam 36 and is secured there by a channel member 132. The lower end of the bar 130 is curled at 134 and is maintained in desired position between the discs by a bell crank 136, pivotally mounted to a member 138 on the supporting arms 74. Bell crank 136 has a lower roller 140 engaging the inside of the curled portion 134 and an upper pivot 142 secured to the surface of the bar 130 as illustrated. The upper end of the lower bar 130 is pivotally connected to a rod 144 and immediately adjacent to that pivot an aperture in the bar receives a rod 146 of a rotary vibrator 148 which, when operated, maintains vibrating action throughout the length of the bar 130 to assist in stripping substantially all of the soil from the inner surfaces of the discs 24.

The soil is directed by the discs 24 and by the stripper bar 130 through a gate 150 secured by brackets 152 to the disc suspension arms 74. Between the gate 150 and the bar 130 the soil is directed into the path of a rotating roto-tiller 154 mounted on a shaft 156 for rotation therewith in the direction of arrow B. It will be noted that the soil shoe and guide 22 is positioned below ground level between the discs 24 and is connected by plates 23 to the arms 74. A spring steel arm 158 is secured at one end of the guide 22 and is pivotally attached to the mixing chamber enclosure 160 through the pivotal mounting of an arm 162 and bracket 164. Arm 158 is wide enough to provide a cover for the trench dug up by the discs 24 and arm 158 is followed by the soil guide and deflector 28 which comprises a pair of spaced blades 166 (only one of which is shown) and the rearwardly mounted forming blade or flap 168. The forward ends of blades 166 are secured to the housing 160 by a pivot rod 170 and flexible cable 172 which, together, maintain the forward end of the deflector in proper forwardly and downwardly directed aligned positions respectively.

The roto-tiller 154 breaks up the soil directed into it by the rotating discs 24 and the earth is subsequently directed by the roto-tiller into the mixing chamber 174 which is defined by the upper housing shell 176 and the lower housing shell 160. Mixing chamber 174 includes a plurality of spaced guide bars 178 which constitute the jaws of a rock crushing unit which, when taken in combination with the drum 180 and rotating rock crushing arms (not shown) crushes any stones or rocks or similar hard pieces of earth and the like that are brought into the mixing chamber by the roto-tiller 154. In this chamber also, the soil is compacted and any water, liquid chemicals, granulated fertilizer, or the like is added to the soil at this point from the storage tanks 188, 190, 192, etc. positioned above the mixing chamber. Granulated fertilizer for example could be directed from the container 192 through conduit 194 into the roto-tiller chamber or it can be directly inserted into the mixing chamber. After the soil has been suitably treated it is driven downwardly under centrifugal force from the drum of the mixing chamber and the arms and paddles therein in the direction of arrow C through a throat 194 defined by plates 196 and 198 of the housings as well as the upper edges of the soil guide 166. The soil coming downwardly through the throat 194 is therefore forced back into the trench and desirably formed by the deflector blades 166 and the forming blade 168 at the back of the throat.

Granular fertilizer may then be drawn from the container 190 and seed similarly drawn from the container 200 and channeled via conduits 202 and 204 into the rear portion of the housing and are directed downwardly into a seeding head 206 which directs the seed into the desired location on top of the trench previously filled from the throat 194. The straw which has been previously chopped by the straw chopping device 66 is driven by the fan means along the straw channel 70 and is blown down through the straw divider 72 to lie on top of the freshly seeded trench.

Figure 3:
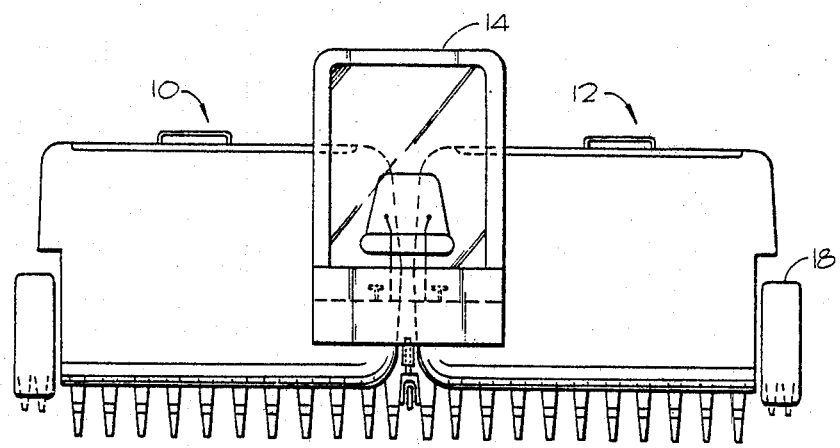
FIG. 3 is a frontal view of the apparatus shown in FIG. 2.
Figure 4:
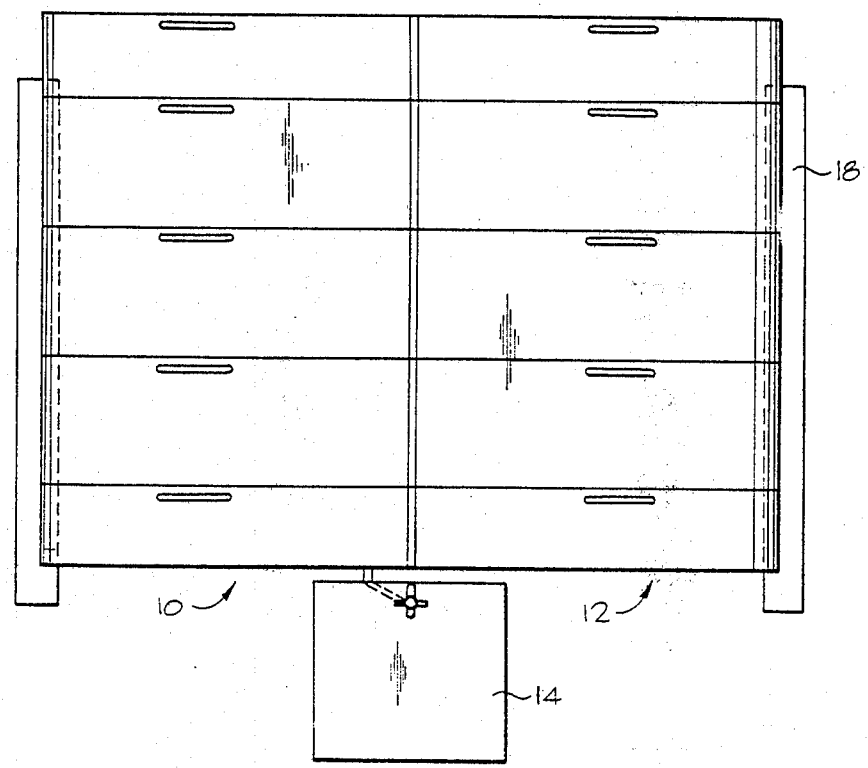
FIG. 4 is a top view of the apparatus shown in FIG. 3.
Figure 5B:
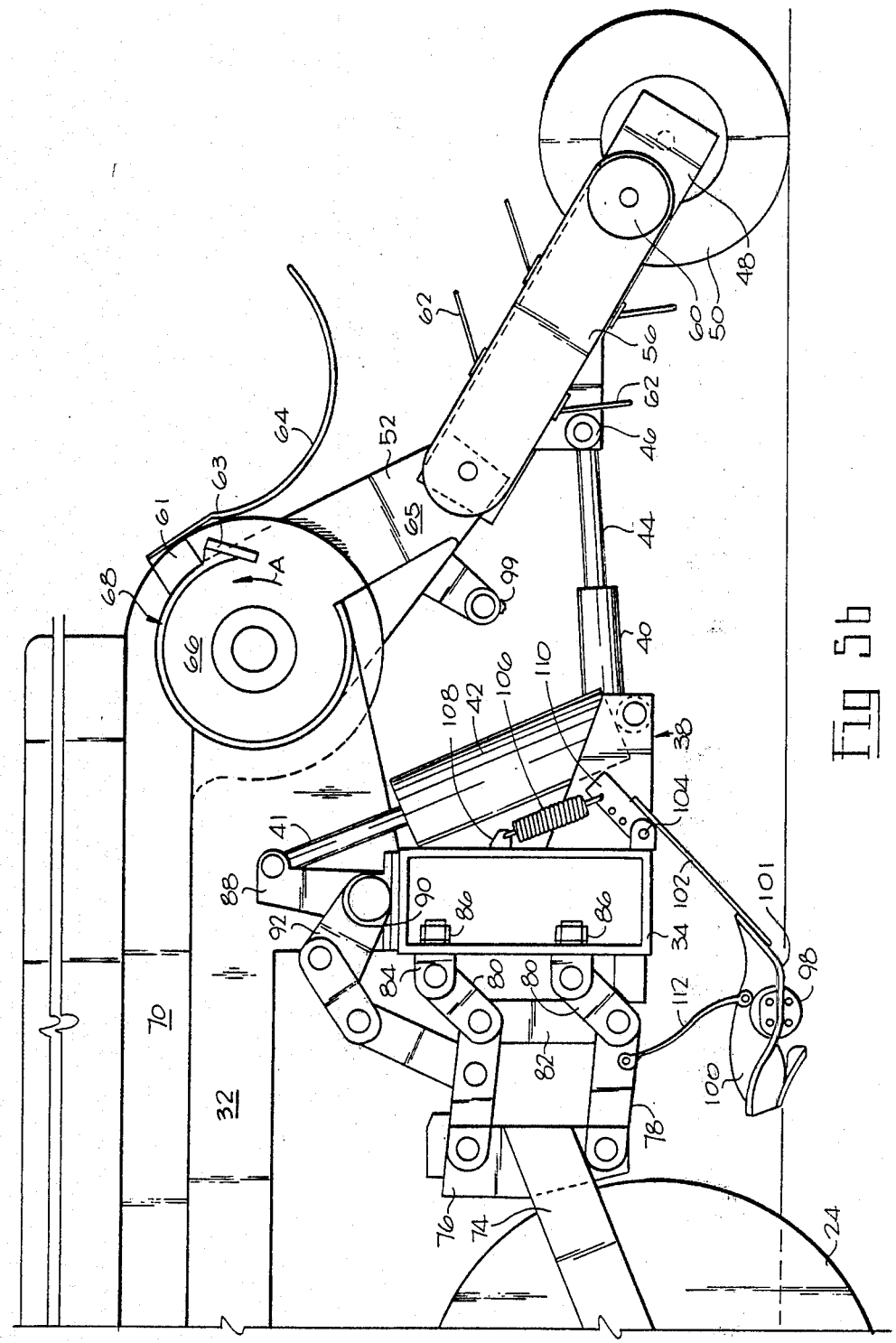

Units such as the straw pickup 66, roto-tiller 154 and rock crusher 174 extend laterally throughout each unit. That is, looking at the frontal view of FIG. 3, there would be one roto-tiller and crusher on either side of the cab in each of the units illustrated.

I claim:

1. A land cultivating machine comprising a mobile chassis having a frame and means on the frame for removing a predetermined amount of soil, cultivating said soil and replacing said soil in the ground as the machine moves forwardly, said machine comprising;
   (a) means for picking up straw ahead of the machine and for cutting the straw for subsequent use;
   (b) means for making a cut of predetermined depth and width in the soil to remove crusted or dried soil and to move that soil onto each side of the path to be treated;
   (c) a disc-supporting suspension arm supported by said frame in a trailing arrangement and in alignment with the path of travel of the machine;
   (d) resilient means for biasing said suspension arm towards the ground surface;
   (e) first and second discs respectively mounted on said suspension arm by first and second axles on either side of a disc spreading guide disposed therebetween, said spreading guide having downwardly tapering surfaces on the lower end thereof and said axles having bearing means for cooperating with said tapering surfaces such that said discs are maintained by said guide in spaced relation with the lower ends thereof inclined toward one another when said discs are disposed in an operating position, and said lower ends of said discs are spread apart if said discs move upwardly in response to ground obstructions;
   (f) a stripping bar engaging the inner surfaces of said discs during rotation thereof;
   (g) shoe means for guiding soil cut from the ground by said discs into the confines of the machine;
   (h) a rotative tilling device mounted rearwardly of said discs in the path of soil being directed into the machine for breaking up the soil and subsequently directing the soil into a mixing chamber rearwardly positioned relative to said tilling device;
   (i) means in said mixing chamber for crushing rocks therein, mixing additives with the soil and directing said soil in packing density into the trench cut by said discs; and
   (j) means for applying seed onto the top of the trench and applying straw onto the top of the seed.

* * * * *